(12) United States Patent
Jung et al.

(10) Patent No.: US 12,362,081 B2
(45) Date of Patent: Jul. 15, 2025

(54) ULTRA-HIGH VOLTAGE DIRECT CURRENT POWER CABLE

(71) Applicant: LS CABLE & SYSTEM LTD., Anyang-si (KR)

(72) Inventors: Hyun Jung Jung, Seoul (KR); Jin Ho Nam, Seoul (KR); Jung Suk Yoo, Suwon-si (KR); Yi Seul Yang, Gunpo-si (KR); Min Sang Cho, Seoul (KR); Sung Ik Heo, Gunpo-si (KR)

(73) Assignee: LS CABLE & SYSTEM LTD., Anyang-si (KR)

( * ) Notice: Subject to any disclaimer, the term of this patent is extended or adjusted under 35 U.S.C. 154(b) by 516 days.

(21) Appl. No.: 16/612,217

(22) PCT Filed: Dec. 4, 2017

(86) PCT No.: PCT/KR2017/014068
§ 371 (c)(1),
(2) Date: Jul. 10, 2023

(87) PCT Pub. No.: WO2018/221802
PCT Pub. Date: Dec. 6, 2018

(65) Prior Publication Data
US 2023/0377768 A1 Nov. 23, 2023

(30) Foreign Application Priority Data

May 31, 2017 (KR) .................. 10-2017-0067561
Nov. 7, 2017 (KR) .................. 10-2017-0147052

(51) Int. Cl.
*H01B 7/02* (2006.01)
*C08K 5/14* (2006.01)
(Continued)

(52) U.S. Cl.
CPC ............... *H01B 3/441* (2013.01); *C08K 5/14* (2013.01); *H01B 7/0225* (2013.01); *H01B 9/027* (2013.01)

(58) Field of Classification Search
CPC ... H01B 1/22; H01B 1/24; H01B 3/30; H01B 3/307; H01B 3/441; H01B 4/12;
(Continued)

(56) References Cited

U.S. PATENT DOCUMENTS

2008/0050588 A1* 2/2008 Broman .............. C08L 23/0815
252/500
2010/0280664 A1 11/2010 Kempter et al.
(Continued)

FOREIGN PATENT DOCUMENTS

| CN | 102332335 A | 1/2012 |
| CN | 102682905 A | 9/2012 |

(Continued)

OTHER PUBLICATIONS

Chinese Office Action for related Chinese Application No. 201780091435.3; action dated Jul. 17, 2020; (6 pages).
(Continued)

*Primary Examiner* — William H. Mayo, III
(74) *Attorney, Agent, or Firm* — K&L Gates LLP

(57) ABSTRACT

An ultra-high voltage direct current (DS) power cable may be provided via a conductor formed by twisting a plurality of strands, an inner semiconducting layer surrounding the conductor, an insulating layer surrounding the inner semiconducting layer; and an outer semiconducting layer surrounding the insulating layer, wherein the insulating layer is formed of an insulation composition containing a polyolefin resin and a crosslinking agent, and the insulating layer is
(Continued)

divided into three equal parts in a thickness direction, the three equal parts including an inner layer, an intermediate layer and an outer layer.

12 Claims, 1 Drawing Sheet

(51) Int. Cl.
*H01B 3/44* (2006.01)
*H01B 9/02* (2006.01)

(58) Field of Classification Search
CPC ...... H01B 7/02; H01B 7/0225; H01B 7/0291; H01B 9/006; H01B 9/027; H01B 13/26; C08K 5/14
USPC .............................. 174/110 R–120 R, 113 R
See application file for complete search history.

(56) References Cited

U.S. PATENT DOCUMENTS

| | | | | |
|---|---|---|---|---|
| 2017/0263348 | A1* | 9/2017 | Combessis | ............ H01B 3/447 |
| 2017/0309366 | A1* | 10/2017 | Larche | ..................... H02G 1/14 |

FOREIGN PATENT DOCUMENTS

| | | | | |
|---|---|---|---|---|
| CN | 203150269 | U | 8/2013 | |
| EP | 3261094 | A1 * | 12/2017 | ........... B29C 48/022 |
| EP | 3611739 | A1 | 2/2020 | |
| JP | H0465031 | A | 3/1992 | |
| JP | H 4212208 | A | 8/1992 | |
| JP | H05120917 | A | 5/1993 | |
| JP | 2002260464 | A | 9/2002 | |
| JP | 2011171004 | A | 9/2011 | |
| JP | 2017-500413 | A | 1/2017 | |
| KR | 1020110112679 | A | 10/2011 | |
| KR | 1020120086072 | A | 8/2012 | |
| KR | 1020120103497 | A | 9/2012 | |
| KR | 101388136 | B1 | 4/2014 | |
| KR | 101408925 | B1 | 6/2014 | |
| KR | 1020150016500 | A | 2/2015 | |
| NL | 7002137 | A | 2/1970 | |
| WO | 2013166683 | A1 | 11/2013 | |
| WO | WO-2015090640 | A1 * | 6/2015 | .............. C08F 10/02 |
| WO | WO-2015090643 | A1 * | 6/2015 | ............. H01B 13/24 |

OTHER PUBLICATIONS

Extended European Search Report for related European Application No. 17911827.8; report dated Mar. 2, 2021; (6 pages).
Japanese Office Action in corresponding JP Application No. 2019-557843, dated Dec. 11, 2020 (5 pages).
Japanese Office Action for related Japanese Application No. 2019-557843; action dated Jul. 1, 2022; (18 pages).
International Search Report for related International Application No. PCT/KR2017/014068; report dated Dec. 6, 2018; (3 pages).
Written Opinion for related International Application No. PCT/KR2017/014068; report dated Dec. 6, 2018; (5 pages).

* cited by examiner

ULTRA-HIGH VOLTAGE DIRECT CURRENT POWER CABLE

CROSS-REFERENCE TO RELATED APPLICATIONS

The present application is a National Stage of International Application No. PCT/KR2017/014068, filed Dec. 4, 2017 which claims priority to Korean Application No. 10-2017-0067561 filed May 31, 2017 and Korean Application No. 10-2017-0147052, filed Nov. 7, 2017, the disclosure of which are incorporated herein by reference.

FIELD OF THE INVENTION

The present invention relates to an ultra-high-voltage direct-current (DC) power cable. Specifically, the present invention relates to an ultra-high-voltage DC power cable capable of simultaneously preventing or minimizing electric field distortion, a decrease in DC dielectric strength, and a decrease in impulse breakdown strength due to accumulation of space charge in an insulator.

BACKGROUND OF THE INVENTION

In general, in a large power system requiring large-capacity and long-distance power transmission, high voltage transmission is necessary to increase a transmission voltage in terms of a reduction of power loss, a construction site problem, and an increase in power transmission capacity.

Power transmission methods may be largely classified into an alternating-current (AC) power transmission method and a direct-current (DC) power transmission method. The DC power transmission method refers to transmission of power by direct current. Specifically, in the DC power transmission method, first, a power transmission side converts AC power into an appropriate voltage, converts the voltage into direct current by a converter, and transmits the direct current to a power reception side via a transmission line, and the power reception side converts the direct current into AC power by an inverter.

In particular, the DC transmission method has been widely used, because this method is advantageous in transmitting a large amount of power over a long distance and can be operated in connection with an asynchronous power system, and a loss rate of direct current is low and stability thereof is high in long-distance transmission, compared to alternating current.

An insulator of a (ultra) high-voltage DC transmission cable used in the DC transmission method may be formed of insulating paper impregnated with an insulating oil or an insulation composition containing a polyolefin resin as a base resin. Recently, as cables are likely to be operated at relatively high temperatures, an insulator formed of an insulation composition containing a polyolefin resin that increases the amount of power transmission and is free from leakage of an insulating oil have come into widespread use.

However, the polyolefin resin has a linear molecular chain structure and thus is applied to an insulating layer of a cable by improving mechanical and thermal properties thereof by a crosslinking process. Thus, space charges are likely to be accumulated in the insulating layer of the cable due to crosslinking by-products inevitably generated due to decomposition of a crosslinking agent during the crosslinking process. The space charges may distort an electric field in an insulator of a (ultra) high-voltage DC transmission cable and thus dielectric breakdown may occur at a voltage lower than an initially designed breakdown voltage.

In the case of a cable used for a current-type DC transmission (LCC) that requires polarity inversion to change a direction of power transmission, an inorganic additive such as a magnesium oxide is uniformly dispersed in an insulating layer of the cable to solve the above problem. The inorganic additive is polarized in a DC electric field and thus space charges may be trapped to minimize electric field distortion caused by the accumulation of space charges. However, in the case of voltage-type DC transmission (VSC), polarity inversion is unnecessary, and an insulation composition with an organic additive added is used to optimize electrical stress to be applied to an insulator of the cable. Thus, it is necessary to accurately control the amount of space charges in an insulating layer.

Therefore, there is an urgent need for an ultra-high-voltage DC power cable which is capable of simultaneously preventing or minimizing electric field distortion, a decrease in DC dielectric strength, and a decrease in impulse breakdown strength due to accumulation of space charges in an insulator, and is particularly applicable to voltage-type DC power transmission (VSC).

BRIEF SUMMARY OF THE INVENTION

The present invention is directed to providing an ultra-high-voltage direct-current (DC) power cable capable of simultaneously preventing or minimizing electric field distortion, a decrease in DC dielectric strength and a decrease in impulse breakage strength due to accumulation of space charges in an insulator.

According to an aspect of the present invention, provided is an ultra-high-voltage direct-current (DC) power cable comprising: a conductor formed by twisting a plurality of strands; an inner semiconducting layer surrounding the conductor; an insulating layer surrounding the inner semiconducting layer; and an outer semiconducting layer surrounding the insulating layer, wherein the insulating layer is formed of an insulation composition containing a polyolefin resin and a crosslinking agent, and the insulating layer is divided into three equal parts in a thickness direction, the three equal parts including an inner layer, an intermediate layer and an outer layer, wherein an average value of the total amounts of the three specific crosslinking by-products among crosslinking by-products included in each layer of these layers is 3,890 ppm or less.

According to another aspect of the present invention, provided is the ultra-high-voltage DC power cable, wherein a total amount of the three types of specific crosslinking by-products included in the inner layer of the insulating layer is 3,990 ppm or less.

According to other aspect of the present invention, provided is the ultra-high-voltage DC power cable, wherein a field enhancement factor (FEF) of the insulating layer defined by the following Equation (1) is 140% or less:

FEF=(maximally increased electric field in insulation sample/electric field applied to insulation sample)*100,   [Equation 1]

wherein the insulation sample is prepared to a thickness of 120 μm by crosslinking the insulation composition of the insulating layer, the electric field applied to the insulation sample is a DC electric field of 50 kV/mm applied to electrodes connected to opposite surfaces of the insulation sample, and the maximally increased electric field in the insulation sample is a maximum value among increase values of the electric field during the application of the DC electric field of 50 kV/mm to the insulation sample for one hour.

According to other aspect of the present invention, provided is the ultra-high-voltage DC power cable, wherein the polyolefin resin comprises a polyethylene resin.

According to other aspect of the present invention, provided is the ultra-high-voltage DC power cable, wherein the crosslinking agent comprises a peroxide crosslinking agent.

According to other aspect of the present invention, provided is the ultra-high-voltage DC power cable, wherein the peroxide crosslinking agent comprises at least one selected from the group consisting of dicumyl peroxide, benzoyl peroxide, lauryl peroxide, t-butyl cumyl peroxide, di(t-butyl peroxy isopropyl) benzene, 2,5-dimethyl-2,5-di(t-butyl peroxy) hexane, and di-t-butyl peroxide.

According to other aspect of the present invention, provided is the ultra-high-voltage DC power cable, wherein the insulation composition further comprises at least one additive selected from the group consisting of an antioxidant, an extrudability enhancer and a crosslinking aid.

According to other aspect of the present invention, provided is the ultra-high-voltage DC power cable, wherein a semiconductive composition of the inner and outer semiconducting layers comprises a crosslinking agent in an amount of 0.1 to 5 parts by weight, based on 100 parts by weight of a base resin.

According to other aspect of the present invention, provided is the ultra-high-voltage DC power cable, wherein the base resin comprises at least one selected from the group consisting of ethylene vinyl acetate (EVA), ethylene methyl acrylate (EMA), ethylene methyl methacrylate (EMMA), ethylene ethyl acrylate (EEA), ethylene ethyl methacrylate (EEMA), ethylene (iso)propyl acrylate (EPA), ethylene (iso)propyl methacrylate (EPMA), ethylene butyl acrylate (EBA), and ethylene butyl methacrylate (EBMA).

In an ultra-high-voltage direct current (DC) power cable according to the present invention, the amount of a specific crosslinking by-product generated during crosslinking can be accurately controlled by adjusting a degree of crosslinking by control of the amount of a crosslinking agent to be added to an insulation composition of an insulating layer and appropriate modification of a base resin, thereby simultaneously preventing or minimizing electric field distortion, a decreased in DC dielectric strength, and a decrease in impulse breakdown strength due to the accumulation of space charges in an insulator.

DETAILED DESCRIPTION OF THE INVENTION

Hereinafter, exemplary embodiments of the present invention will be described in detail. The present invention is, however, not limited thereto and may be embodied in many different forms. Rather, the embodiments set forth herein are provided so that this disclosure may be thorough and complete and fully convey the scope of the invention to those skilled in the art. Throughout the specification, the same reference numbers represent the same elements.

Figure 1:
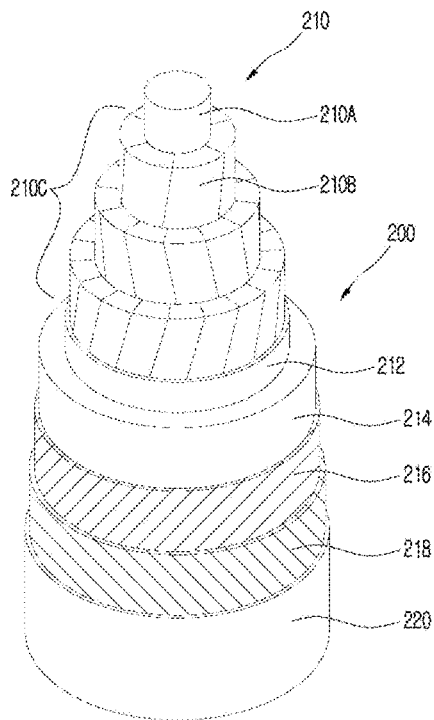
FIG. 1 is a schematic longitudinal sectional view of an ultra-high-voltage direct-current (DC) power cable.

FIG. 1 is a schematic longitudinal sectional view of an ultra-high-voltage direct-current (DC) power cable according to the present invention.

Referring to FIG. 1, a power cable 200 includes a cable core part including a conductor 210 formed by twisting a plurality of strands, an inner semiconducting layer 212 surrounding the conductor 210, an insulating layer 214 surrounding the inner semiconducting layer 212, and an outer semiconducting layer 216 surrounding the insulating layer 214, the cable core part being configured to transmit power along the conductor 210 only in a lengthwise direction of the cable and prevent leakage of current in a radial direction of the cable.

The conductor 21 acts as a path through which current flows to transmit power, and may be formed of a material, e.g., copper or aluminum, having high conductivity to minimize power loss and having strength and flexibility appropriate to manufacture and use a cable. The conductor 210 may be either a circularly compressed conductor manufactured by twisting a plurality of round strands and compressing them into a round shape or a flat conductor having a round cross-section and including a flat strand layer 210C consisting of a round center strand 210A and flat strands 210B twisted to surround the round center strand 210A. The flat conductor has a higher space factor than that of the circularly compressed conductor and thus an outer diameter of a cable may decrease when the flat conductor is used.

However, because the conductor 210 is formed by twisting a plurality of strands, a surface thereof is not smooth and thus an electric field may not be uniform and a corona discharge is likely to occur therein locally. In addition, when a gap occurs between the surface of the conductor 210 and the insulating layer 214 described later, insulation performance may decrease. In order to solve the above problems, the inner semiconducting layer 212 is formed outside the conductor 210.

The inner semiconducting layer 212 is formed by adding conductive particles, such as carbon black, carbon nanotubes, carbon nanoplates or graphite, to an insulating material and thus has semiconductivity, and prevents a sudden electric field change between the conductor 210 and the insulating layer 214 described later, thereby stabilizing insulation performance. In addition, the inner semiconducting layer 212 suppresses an uneven charge distribution on a surface of the conductor 210 to achieve a uniform electric field and prevents the occurrence of a gap between the conductor 210 and the insulating layer 214 to suppress a corona discharge, dielectric breakdown, etc.

The insulating layer 214 is provided outside the inner semiconducting layer 212 to electrically insulate the inner semiconducting layer 212 from the outside, thereby preventing current flowing through the conductor 210 from leaking to the outside. In general, a breakdown voltage of the insulating layer 214 should be high and insulation performance thereof should be stably maintained for a long time. Furthermore, the insulating layer 214 should have low dielectric loss and heat resistance performance. Accordingly, the insulating layer 214 may be formed of a polyolefin resin such as polyethylene and polypropylene, and preferably, a polyethylene resin. Here, the polyethylene resin may be a crosslinked resin.

The outer semiconducting layer 216 is provided outside the insulating layer 214. Similar to the inner semiconducting layer 12, the outer semiconducting layer 216 is formed of a material having semiconductivity by adding conductive particles, such as carbon black, carbon nanotubes, carbon nanoplates, or graphite, to an insulating material, and suppresses a non-uniform charge distribution between the insulating layer 214 and a metal sheath 22 described later, thereby stabilizing insulation performance. In addition, the outer semiconducting layer 216 planarizes a surface of the insulating layer 214 of the cable to mitigate electric field concentration to prevent a corona discharge, and physically protects the insulating layer 214.

The core part of the cable, and particularly, the inner semiconducting layer 212, the insulating layer 214, and the outer semiconducting layer 216 are parts in which electric field distortion is most likely to occur due to generation, accumulation or injection of space charges and dielectric breakdown is most likely to result from the electric field distortion, as will be described in detail later.

The core part may further include a moisture absorbing layer to prevent moisture from penetrating the cable. The moisture absorbing layer may be formed between the twisted strands and/or outside the conductor 210, and be in the form of powder, tape, a coating layer or a film containing a super absorbent polymer (SAP) capable of quickly absorbing moisture penetrating the cable and having excellent capability of maintaining a state of absorbing the moisture to prevent penetration of moisture in the lengthwise direction of the cable. In addition, the moisture absorbing layer may have semiconductivity to prevent a sudden electric field change.

A protective sheath part is provided outside the core part. A power cable laid in an environment exposed to water, such as the seabed, further includes an outer cover part. The protective sheath part and the outer cover part protect the core part of the cable from various environmental factors, such as moisture penetration, mechanical trauma, and corrosion, which may affect power transmission performance of the cable.

The protective sheath part includes a metal sheath layer 218 and an inner sheath 220 to protect the core part of the cable from fault current, external forces or other external environmental factors.

The metal sheath layer 218 may be grounded at an end of the power cable to serve as a path through which fault current flows when an accident such as a ground fault or a short circuit occurs, protect the cable from external shocks, and prevent an electric field from being discharged to the outside of the cable. In addition, in the case of a cable installed in an environment such as the sea bottom, the metal sheath layer 218 may be formed to seal the core part to prevent degradation of insulation performance due to invasion of foreign substances such as moisture. For example, the metal sheath layer 218 may be formed to have seamless outer surfaces by extruding a molten metal outside the core part to enhance watertightness performance. The metal may be lead or aluminum, preferably, lead having excellent corrosion resistance to seawater, particularly in the case of a submarine cable, and more preferably, a lead alloy containing a metal element to supplement mechanical properties.

Furthermore, an anti-corrosion compound, e.g., blown asphalt, may be applied onto a surface of the metal sheath layer 218 to further improve corrosion resistance, watertightness, etc. of the cable and improve adhesion to the inner sheath 220. A nonwoven copper wire tape (not shown) and a moisture absorbing layer may be additionally provided between the metal sheath layer 218 and the core part. The nonwoven copper wire tape includes copper wire, a nonwoven tape, and the like to facilitate electrical contact between the outer semiconducting layer 216 and the metal sheath layer 218. The moisture absorbing layer is in the form of powder, a tape, a coating layer or a film containing a super absorbent polymer (SAP) capable of quickly absorbing moisture penetrating the cable and maintaining a state of absorbing the moisture to prevent penetration of moisture in the lengthwise direction of the cable. In addition, copper wire may be included in the water absorbing layer to prevent a sudden electric field change in the water absorbing layer.

The inner sheath 220 formed of a resin such as polyvinyl chloride (PVC) or polyethylene is provided outside the metal sheath layer 218 to improve corrosion resistance, watertightness, etc. of the cable and protect the cable from mechanical trauma and other external environmental factors such as heat and ultraviolet rays. In particular, a polyethylene resin having excellent watertightness is preferably used in the case of a power cable laid on the sea bottom, and a polyvinyl chloride resin is preferably used in an environment requiring flame retardancy.

The protective sheath part may further include a metal reinforcement layer formed of a semiconducting non-woven fabric tape or the like and buffers an external force applied to the power cable and an outer sheath formed of a resin such as polyvinyl chloride or polyethylene so as to further improve the corrosion resistance, watertightness, etc. of the power cable and protect the power cable from mechanical trauma and other external environmental factors such as heat and ultraviolet rays.

A power cable laid on the sea bottom is easily damaged by the anchor of a ship, a bending force caused by sea currents or waves, friction with the sea bottom, and the like and thus the outer cover part may be provided outside the protective sheath part to prevent damage to the power cable.

The outer cover part may include an armor layer and a serving layer. The armor layer may be formed of steel, galvanized steel, copper, brass, bronze, or the like, and may be formed in at least one layer by cross-winding wire having a circular or flat cross section. The armor layer enhances mechanical properties and performance of the cable and additionally protects the cable from external forces. The serving layer formed of polypropylene yarn or the like is formed in one or more layers on and/or under the armor layer to protect the cable. The serving layer which is an outermost layer may be formed of two or more materials of different colors to secure visibility of the cable laid on the sea bottom.

The inner semiconducting layer 212 and the outer semiconducting layer 216 are formed by extrusion of a semiconductive composition in which conductive particles such as carbon black, carbon nanotubes, carbon nanoplates or graphite are dispersed in a base resin and a crosslinking agent, an antioxidant, a scorch inhibitor, and the like are additionally added.

Here, the base resin is preferably formed of an olefin resin similar to the base resin of the insulating composition of the insulating layer 214 for interlayer adhesion between the semiconducting layers 212 and 216 and the insulating layer 14. More preferably, the base resin is formed of olefin and a polar monomer, e.g., ethylene vinyl acetate (EVA), ethylene methyl acrylate (EMA), ethylene methyl methacrylate (EMMA), ethylene ethyl acrylate (EEA), ethylene ethyl methacrylate (EEMA), ethylene (iso)propyl acrylate (EPA), ethylene (iso)propyl methacrylate (EPMA), ethylene butyl acrylate (EBA), ethylene butyl methacrylate (EBMA) or the like, in consideration of compatibility with the conductive particles.

In addition, the crosslinking agent may be a silane crosslinking agent or an organic peroxide crosslinking agent, such as dicumyl peroxide, benzoyl peroxide, lauryl peroxide, t-butyl cumyl peroxide, di(t-butyl peroxy isopropyl) benzene, 2,5-dimethyl-2,5-di(t-butyl peroxy) hexane, or di-t-butyl peroxide, according to the method of crosslinking the base resin contained in the semiconducting layers 212 and 216.

The semiconductive composition of the inner and outer semiconducting layers 212 and 216 may include 45 to 70 parts by weight of conductive particles, such as carbon black, based on 100 parts by weight of the base resin. When the amount of the conductive particles is less than 45 parts by weight, sufficient semiconducting properties may not be realized, whereas when the amount of the conductive particles is greater than 70 parts by weight, the extrudability of the inner and outer semiconducting layers 212 and 216 may decrease and thus surface properties or productivity of the cable may be lowered.

In the semiconductive composition of the inner and outer semiconducting layers 212 and 216, the amount of the crosslinking agent may be accurately controlled to be 0.1 to 5 parts by weight, and preferably, 0.1 to 1.5 parts by weight, based on 100 parts by weight of the base resin.

Here, when the amount of the crosslinking agent is greater than 5 parts by weight, the amount of crosslinking by-products inevitably generated during crosslinking of the base resin contained in the semiconductive composition may be excessive, and the crosslinking by-products may move into the insulating layer 214 via the interface between the semiconducting layers 212 and 216 the insulating layer 214 and thus distortion of an electric field may be accelerated due to the accumulation of heterocharges, thereby reducing a breakdown voltage of the insulating layer 214. In contrast, when the amount of the crosslinking agent is less than 0.1 parts by weight, a degree of crosslinking is insufficient and thus mechanical properties, heat resistance, etc. of the semiconducting layers 212 and 216 may be insufficient.

The insulating layer 214 may be formed of, for example, a polyolefin resin, such as polyethylene or polypropylene, as a base resin, and may be preferably formed by extrusion of an insulation composition containing a polyethylene resin.

The polyethylene resin may include ultra-low-density polyethylene (ULDPE), low-density polyethylene (LDPE), linear low-density polyethylene (LLDPE), medium-density polyethylene (MDPE), high-density polyethylene (HDPE), or a combination thereof. Alternatively, the polyethylene resin may include a homopolymer, a random or block copolymer of α-olefin, such as ethylene, propylene, 1-butene, 1-pentene, 1-hexene, or 1-octene, or a combination thereof.

In addition, the insulating composition of the insulating layer 214 may include a crosslinking agent and thus the insulating layer 214 may be formed of crosslinked polyolefin (XLPO), and preferably, crosslinked polyethylene (XLPE) by a separate crosslinking process during or after extrusion. Alternatively, the insulating composition may further include other additives such as an antioxidant, an extrusion enhancer, and a crosslinking aid.

The crosslinking agent contained in the insulating composition may be the same as that contained in the semiconductive composition, and may be, for example, a silane crosslinking agent or an organic peroxide crosslinking agent, such as dicumyl peroxide, benzoyl peroxide, lauryl peroxide, t-butyl cumyl peroxide, di(t-butyl peroxy isopropyl) benzene, 2,5-dimethyl-2,5-di(t-butyl peroxy) hexane, or di-t-butyl peroxide. Here, the crosslinking agent may be contained in the insulation composition in an amount of less than 1 wt %, for example, an amount of 0.1 wt % or more and less than 1 wt %, based on the total weight of the insulation composition.

The present inventors completed the present invention through experimental confirmation that specific crosslinking by-products causing generation of space charges among crosslinking by-products inevitably generated during crosslinking of the insulating layer 214 were α-cumyl alcohol (α-CA), acetophenone (AP), and α-methyl styrene (α-MS), the amounts of the specific crosslinking by-products were limited (particularly, according to a position on the insulating layer 214 in a thickness direction of the insulating layer 214) by limiting the amount of the crosslinking agent contained in the insulation composition of the insulating layer 214 to be less than 1 wt % and performing degassing after the crosslinking of the insulating layer, and generation of space charges and electric field distortion were significantly reduced due to the limitation of the amount of the specific crosslinking by-products, thereby simultaneously preventing or minimizing a decrease in DC dielectric strength and impulse breakdown strength of the insulating layer 214.

Furthermore, the present inventors completed the present invention through experimental confirmation that a problem that a degree of crosslinking of the insulating layer 214 may be lowered due to the limitation of the amount of the crosslinking agent to be less than 1 wt % and thus the mechanical and thermal properties of the insulating layer 214 may be lowered can be fixed by achieving a crosslinking degree of 60% or more, e.g., 60 to 70%, by increasing vinyl group content of the base resin contained in the insulation composition of the insulating layer 214.

In detail, when the insulating layer 214 was divided into three parts, i.e., an inner layer which is a lower layer located directly on the conductor 10, an intermediate layer on the inner layer, and an outer layer on the intermediate layer, in a thickness direction thereof, an average value of the total amounts of the three specific crosslinking by-products of these layers was adjusted to 3,890 ppm or less to suppress generation of space charges in the insulating layer 214. Thus, a field enhancement factor (FEF) of Equation 1 below indicating a degree of electric field distortion in the insulating layer 214 was adjusted to about 140% or less, thereby simultaneously preventing or minimizing a decrease in DC dielectric strength and impulse breakdown strength of the insulating layer 214.

FEF=(maximally increased electric field in insulation sample/electric field applied to insulation sample)*100      [Equation 1]

In Equation 1 above, the insulation sample was prepared to a thickness of 120 μm by crosslinking the insulation composition of the insulating layer 214.

The electric field applied to the insulation sample was a DC electric field of 50 kV/mm applied to electrodes connected to opposite surfaces of the insulation sample.

The maximally increased electric field in the insulation sample is a maximum value among increase values of the electric field during the application of the DC electric field of 50 kV/mm to the insulation sample for one hour.

Furthermore, the inner layer of the insulating layer 214 is located directly on the conductor 210 to form a heterogeneous interface with the inner semiconducting layer 212 and thus dielectric breakdown is likely to occur therein because a relatively high electric field is applied thereto. Thus, the total amount of the three specific crosslinking by-products in the inner layer is more preferably adjusted to 3,990 ppm or less.

EXAMPLES

1. Preparation Examples of Model Cable

Model cables of examples and comparative examples, each including an inner semiconducting layer, an insulating layer, and an outer semiconducting layer, having an insulation thickness of about 4 mm, and including a conductor with a cross-sectional area of about 400SQ were manufactured, in which the amount of a crosslinking agent to be added to the insulating layer was adjusted and the amounts of crosslinking by-products were adjusted by crosslinking and degassing. The amounts of crosslinking by-products were adjusted according to an inner layer, an intermediate layer and an outer layer divided from the insulating layer in a thickness direction and the types of crosslinking by-products, as shown in Table below. The amounts of the crosslinking by-products were measured by collecting a sample at any intermediate point on each layer.

TABLE 1

| | | Crosslinking By-product Content (ppm) | | | |
|---|---|---|---|---|---|
| | | α-CA | AP | α-MS | total |
| comparative example 1 | inner layer | 3112 | 1163 | 149 | 4424 |
| | intermediate layer | 3037 | 1406 | 568 | 5011 |
| | outer layer | 1919 | 1011 | 569 | 3499 |
| | average | 2689.3 | 1193.3 | 428.7 | 4311.3 |
| comparative example 2 | inner layer | 2947 | 1159 | 181 | 4287 |
| | intermediate layer | 2885 | 1443 | 641 | 4969 |
| | outer layer | 1667 | 853 | 475 | 2995 |
| | average | 2499.7 | 1151.7 | 432.3 | 4083.7 |
| comparative example 3 | inner layer | 2658 | 1073 | 261 | 3992 |
| | intermediate layer | 2595 | 1378 | 722 | 4695 |
| | outer layer | 1730 | 835 | 476 | 3041 |
| | average | 2327.7 | 1095.3 | 486.3 | 3909.3 |
| example 1 | inner layer | 2681 | 1052 | 257 | 3990 |
| | intermediate layer | 2509 | 1278 | 737 | 4524 |
| | outer layer | 1799 | 859 | 498 | 3156 |
| | average | 2329.7 | 1063.0 | 497.3 | 3890.0 |
| example 2 | inner layer | 2412 | 896 | 274 | 3582 |
| | intermediate layer | 2359 | 1046 | 553 | 3958 |
| | outer layer | 1463 | 540 | 373 | 2376 |
| | average | 2078.0 | 827.3 | 400.0 | 3305.3 |
| example 3 | inner layer | 2254 | 854 | 259 | 3367 |
| | intermediate layer | 2501 | 1065 | 507 | 4073 |
| | outer layer | 1593 | 610 | 394 | 2597 |
| | average | 2116.0 | 843.0 | 386.7 | 3345.7 |

2. Measurement of Field Enhancement Factor (FEF)

An FEF of Equation 1 was measured by collecting an insulation sample having a thickness of about 120 μm from the insulating layer of each of the model cables of the comparative examples and the examples and applying a DC electric field of 50 kV/mm to the insulation sample for one hour. A measurement result is as shown in Table 2 below and FIG. 2. The FEF was measured simultaneously with the measurement of the amounts of the crosslinking by-products to identify a correlation between the amount of crosslinking by-product content and the FEF.

TABLE 2

| | FEF (%) |
|---|---|
| comparative example 1 | 159 |
| comparative example 2 | 157 |
| comparative example 3 | 165 |
| example 1 | 137 |
| example 2 | 135 |
| example 3 | 132 |

Figure 2:
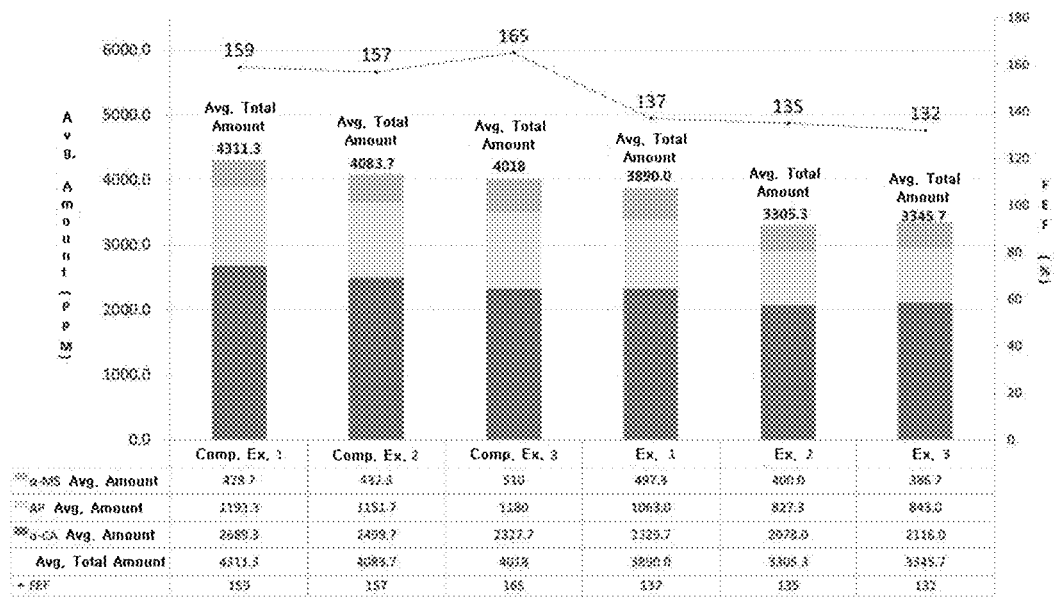
FIG. 2 is a graph showing a result of measuring field enhancement factors (FEF) of examples.

As shown in Table 2 above and FIG. 2, in each of the insulation samples of comparative examples 1 to 3, in which the amounts of three specific crosslinking by-products were not controlled, the FEF indicating electric field distortion due to generation of space charges was high, i.e., about 160%. Thus, it is expected that dielectric strength decreased greatly.

In contrast, in each of the insulation samples of examples 1 to 3 of the present invention, the amounts of three specific crosslinking by-products were accurately controlled to suppress generation of space charges and thus the FEF indicating electric field distortion was controlled to be low, i.e., 140% or less. Therefore, it is expected that a decrease in electric strength was minimized.

While the present invention has been described above with respect to exemplary embodiments thereof, it would be understood by those of ordinary skill in the art that various changes and modifications may be made without departing from the technical conception and scope of the present invention defined in the following claims. Thus, it is clear that all modifications are included in the technical scope of the present invention as long as they include the components as claimed in the claims of the present invention.

The invention claimed is:

1. An ultra-high-voltage direct-current (DC) power cable comprising:
    a conductor formed by twisting a plurality of strands;
    an inner semiconducting layer surrounding the conductor;
    an insulating layer surrounding the inner semiconducting layer; and
    an outer semiconducting layer surrounding the insulating layer,
    wherein the insulating layer is formed of an insulation composition containing a polyolefin resin and a crosslinking agent, and
    the insulating layer is divided into three equal parts in a thickness direction, the three equal parts including an inner layer, an intermediate layer and an outer layer,
    wherein an average value of a total amount of α-cumyl alcohol (α-CA), acetophenone (AP) and α-methyl styrene (α-MS) among crosslinking by-products included among the inner layer, the intermediate layer, and the outer layer is 4,000 ppm or less, and
    wherein a total amount of α-cumyl alcohol (α-CA), acetophenone (AP) and α-methyl styrene (α-MS) among the crosslinking by-products included in the inner layer is 3,990 ppm or less.

2. The ultra-high-voltage DC power cable of claim 1, wherein a field enhancement factor (FEF) of the insulating layer defined by the following Equation (1) is 140% or less:

FEF=(maximally increased electric field in insulation sample/electric field applied to insulation sample)*100,  [Equation 1]

wherein the insulation sample is prepared to a thickness of 120 micrometers (μm) by crosslinking the insulation composition of the insulating layer, the electric field applied to the insulation sample is a DC electric field of 50 kV/mm applied to electrodes connected to opposite surfaces of the insulation sample, and the maximally increased electric field in the insulation sample is a maximum value among increase values of the electric field during the application of the DC electric field of 50 kV/mm to the insulation sample for one hour.

3. The ultra-high-voltage DC power cable of claim 1, wherein the polyolefin resin comprises a polyethylene resin.

4. The ultra-high-voltage DC power cable of claim 1, wherein the crosslinking agent comprises a peroxide crosslinking agent.

5. The ultra-high-voltage DC power cable of claim 4, wherein the peroxide crosslinking agent comprises at least one selected from the group consisting of dicumyl peroxide, benzoyl peroxide, lauryl peroxide, t-butyl cumyl peroxide, di(t-butyl peroxy isopropyl) benzene, 2,5-dimethyl-2,5-di(t-butyl peroxy) hexane, and di-t-butyl peroxide.

6. The ultra-high-voltage DC power cable of claim 1, wherein the insulation composition further comprises at least one additive selected from the group consisting of an antioxidant, an extrudability enhancer and a crosslinking aid.

7. The ultra-high-voltage DC power cable of claim 1, wherein a semiconductive composition of the inner and outer semiconducting layers comprises a crosslinking agent in an amount of 0.1 to 5 parts by weight, based on 100 parts by weight of a base resin.

8. The ultra-high-voltage DC power cable of claim 7, wherein the base resin comprises at least one selected from the group consisting of ethylene vinyl acetate (EVA), ethylene methyl acrylate (EMA), ethylene methyl methacrylate (EMMA), ethylene ethyl acrylate (EEA), ethylene ethyl methacrylate (EEMA), ethylene (iso) propyl acrylate (EPA), ethylene (iso) propyl methacrylate (EPMA), ethylene butyl acrylate (EBA), and ethylene butyl methacrylate (EBMA).

9. The ultra-high-voltage DC power cable of claim 1, wherein a total amount of α-cumyl alcohol (α-CA), acetophenone (AP) and α-methyl styrene (α-MS) among the crosslinking by-products included in the outer layer is less than in the inner layer.

10. The ultra-high-voltage DC power cable of claim 1, wherein a total amount of α-cumyl alcohol (α-CA), acetophenone (AP) and α-methyl styrene (α-MS) among the crosslinking by-products included in the intermediate layer is greater than in the inner layer.

11. The ultra-high-voltage DC power cable of claim 1, wherein a total amount of α-cumyl alcohol (α-CA), acetophenone (AP) and α-methyl styrene (α-MS) among the crosslinking by-products included in the intermediate layer are different than in the inner layer, and
    wherein a total amount of α-cumyl alcohol (α-CA), acetophenone (AP) and α-methyl styrene (α-MS) among the crosslinking by-products included in the outer layer are different than in the inner layer.

12. The ultra-high-voltage DC power cable of claim 1, wherein a total amount of α-cumyl alcohol (α-CA), acetophenone (AP) and α-methyl styrene (α-MS) among the crosslinking by-products included in the intermediate layer are different than in the inner layer, and
    wherein a total amount of α-cumyl alcohol (α-CA), acetophenone (AP) and α-methyl styrene (α-MS) among the crosslinking by-products included in the outer layer are different than in the inner layer.

* * * * *